Aug. 1, 1967     A. J. REID     3,334,025

DISTILLING HEAD

Filed Dec. 7, 1964     3 Sheets-Sheet 3

INVENTOR:
ALEXANDER J. REID

BY Howson & Howson

ATTYS.

United States Patent Office 3,334,025
Patented Aug. 1, 1967

3,334,025
DISTILLING HEAD
Alexander J. Reid, Feasterville, Pa., assignor to Publicker Industries Inc., Philadelphia, Pa., a corporation of Pennsylvania
Filed Dec. 7, 1964, Ser. No. 416,372
15 Claims. (Cl. 202—204)

The present invention relates generally to laboratory distilling apparatus and more particularly to a novel laboratory distilling head which provides an automatic continuous separation of two immiscible distillate phases and which permits the selective reflux of either distillate phase.

Distillation processes resulting in a two-phase distillate are commonly employed in laboratory work for the separation and purification of volatile liquids. For example, many liquids having limited water solubility, such as benzene, may be freed from dissolved water by distillation wherein the water layer is removed while the other liquid is returned as reflux. Even a liquid as soluble as ethyl alcohol may be dehydrated in this manner by the addition of a liquid such as benzene or isopropyl ether to obtain a two-phase distillate. In a similar manner, dissolved volatile liquid may be removed from aqueous solutions, for instance after a chemical reaction or a liquid-liquid extraction. As a further example, materials having nearly the same boiling point may be separated by the addition of water or other third material to form easily separated azeotropes.

Laboratory distilling operations, although generally batch type operations, are often run over substantial periods of time, in some instances extending for several days. However, laboratory apparatus has not heretofore been available for the separation by decantation of two-phase distillate which does not require continuous observation and adjustment. The need for such adjustment stems primarily from the fact that the relative flow rates of the two phases vary widely during a batch distillation, and to a lesser but rarely negligible extent during a continuous distillation. In most prior arrangements it has been necessary to manually adjust the outflow of the separated phases to compensate for the varying flow rates. The present distilling head is wholly automatic in operation and requires no adjustment regardless of the phase flow rate variations down to and including complete exhaustion of any of the phases.

It is also desirable under certain circumstances to reverse the distillate flow pattern, and the present invention provides a distilling head which permits the reflux of either phase of a two-phase distillate. For example, with such a reversible head, a liquid may be purified by wet distillation and then dehydrated by returning the wet product to the still without changing the distilling head.

In view of the above, it is a primary object of the present invention to provide a laboratory distilling head which provides an automatic continuous separation of a two-phase distillate.

A further object of the invention is to provide a distilling head as described which is reversible to permit the selective reflux of either distillate phase.

An additional object of the invention is to provide a distilling head as described, the operation of which is unaffected by variations in the rate of flow or the stoppage of flow of either distillate phase.

Another object of the invention is to provide a distilling head as described which is suited for the separation of immiscible distillate phases having a substantial range of specific gravities.

Additional objects and advantages of the invention will be more readily apparent from the following detailed description of embodiments thereof when taken together with the accompanying drawings in which.

Figure 1:
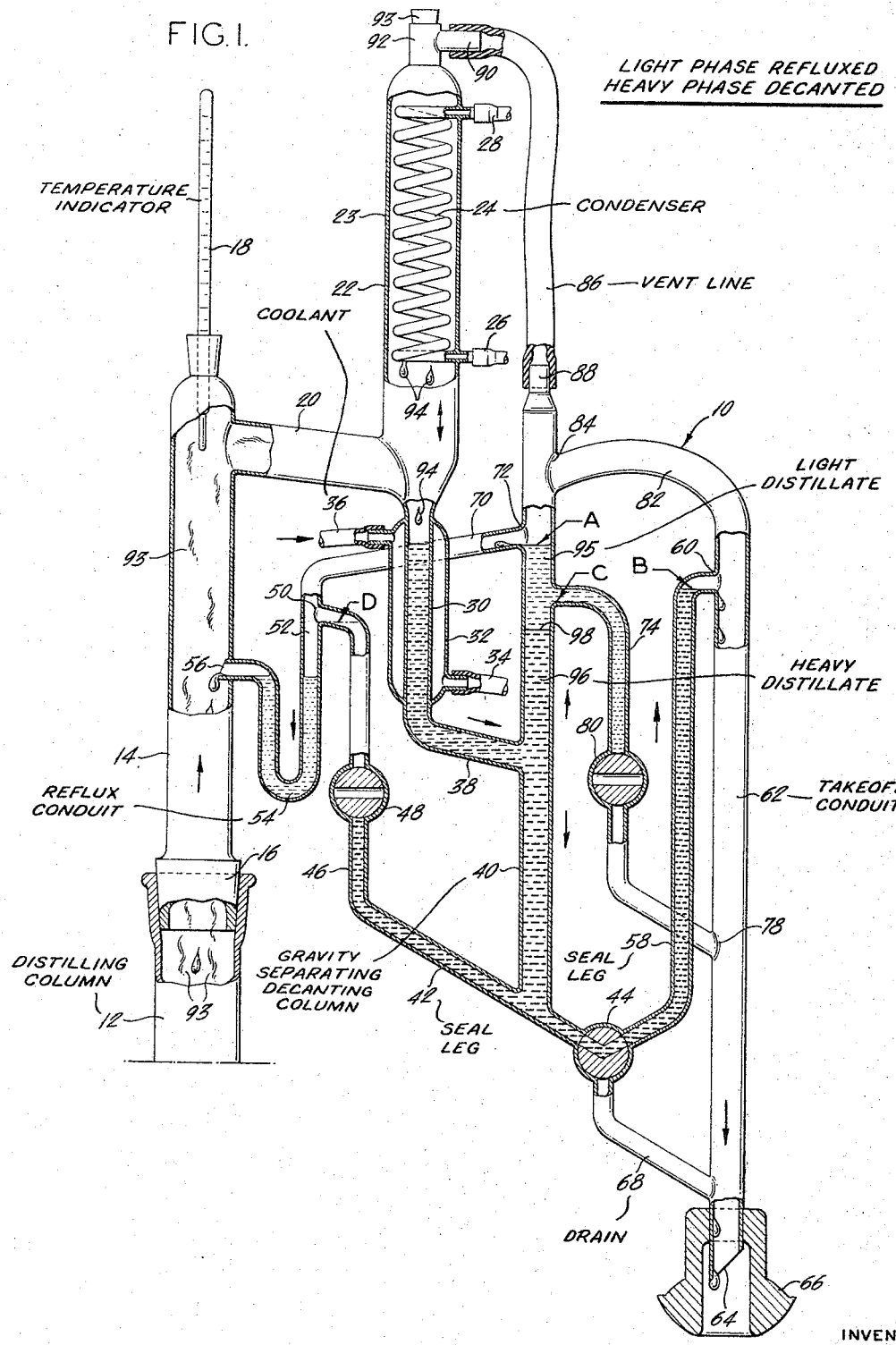
FIG. 1 is a front elevational view of a distilling head embodying the present invention shown in operation to effect the separation of a two-phase distillate wherein the heavier phase is drawn off and the lighter phase is refluxed.

Referring to FIG. 1 of the drawings, a laboratory distilling head 10 embodying a preferred construction of the invention is shown mounted upon the partially illustrated laboratory distilling column 12. The distilling head 10, which is formed of heat-resistant glass, includes a vapor riser 14, the lower end of which opens into the upper end of the distilling column 12 through the connector 16. The upper end of the vapor riser is adapted to receive temperature measuring apparatus, in this instance a thermometer 18 although other means such as a thermocouple could be substituted.

The upper end of riser 14 opens into a lateral duct 20 which slopes downwardly away from the riser to prevent back drainage of condensed vapors. The lateral duct 20 connects with the lower end of the condenser 22 which comprises condenser housing 23 enclosing the condensing coil 24 having cooling fluid inlet and outlet ports 26 and 28. The lower end of the condenser housing funnels downwardly into a vertical distillate conduit 30 surrounded by cooling jacket 32 having coolant inlet and outlet connections 34 and 36. To permit a more flexible operation of the head, the condensing coil and cooling jacket are preferably provided with independently controllable sources of cooling fluid.

The conduit 30 continues in a downwardly sloping portion 38 which opens into a vertical decanting column 40 at a point approximately midway along the height thereof. The decanting column 40, within which a gravity separation of the distillate phases takes place, is connected at its lower end with the sloping conduit 42 which extends downwardly into the three-way stopcock 44. The conduit 42 continues upwardly in a vertical portion 46 provided with a stopcock 48. The upper end of the portion 46 is connected at 50 with the reflux conduit 52 which extends downwardly forming a vapor seal 54 and terminates within the vapor riser 14 in a drip tip 56.

Extending upwardly from the three-way stopcock 44 is the conduit 58 connecting at its upper end 60 with the vertical take-off conduit 62. The lower end of the take-off conduit terminates in a drip tip 64 and is provided with connector 66 for connection with a suitable receiver. A drain line 68 extends from the stopcock 44 to the take-off conduit 62.

A downwardly sloping conduit 70 connects with the upper region of the decanting column 40 at 72 and opens at its downward end into the reflux conduit 52. Also connected with the upper region of the decanting column is a conduit 74 equipped with a stopcock 80 and extending downwardly to a juncture 78 with the take-off conduit 62.

In order to equalize pressures in the distilling head, a vent line 82 is provided from the take-off conduit 62 to vent the decanting column 40 at a point 84 above the conduit connection 72. An additional vent line 86 joins the open end 88 of the decanting column with the vent port 90 at the top of the condenser housing 22, the chimney 92 of which is stoppered by any suitable means 93 and may be employed for adding liquids to the head.

For the proper operation of the device it is essential as will be evident from the discussion of the operation below that the relative heights of certain conduit connections be maintained in a specific relationship. In particular, it is necessary that the level A at which fluid in the decanting column 40 flows into the conduit 70 be higher than the level B at which fluid in the conduit 58 flows into the take-off conduit 62. Additionally, it is essential that the level C at which fluid flows from the decanting column 40 into the conduit 74 be above the level D at which fluid in the conduit 46 flows into the reflux conduit 52. The required relationship of levels A and B is independent of the relationship of the levels C and D aside from the fact that the level C must be below the level A since the conduit 70 is always open and serves as a vent for the reflux conduit 64.

In the operation of the distilling head, vapors 93 rising from the distilling column 12 pass through the vapor riser 14 and duct 20 and are condensed in the condenser 22. The distillate 94 drips from the condenser into the conduit 30, passing through the cooling jacket 32 and into the decanting column 40. With the stopcock 44 initially closed, the distillate accumulates in the decanting column wherein a gravity separation of the distillate into light and heavy distillate phases 95 and 96 divided by interface 98 takes place.

The flow pattern of the separated distillate phases is controlled by the setting of the several stopcocks to permit or prevent fluid flow from the decanting column 40 through conduits 46, 58 and 74. Conduits 46 and 58 which connect with the lower end of the decanting column in effect constitute seal legs, each of which when filled functions in a well known manner to remove the separated heavy phase from the bottom of the decanting column at a rate corresponding to the addition of such phase to the decanting column or in response to an increased accumulation in the decanting column of the light phase. Each seal leg limits the level of the heavy phase in the decanting column to the seal leg outlet level B or D, thus insuring that fluid rising above that level is light phase distillate.

From the above description it can be understood that the seal leg of conduit 46 constitutes means for refluxing the heavy distillate phase while the seal leg of conduit 58 provides means for taking off the heavy phase. Since as specified above the level A is above the level B, and level C is above D, the light phase may be drawn off through the conduit 74 or refluxed through the conduit 70, depending upon the seal leg employed for the disposition of the heavy phase.

The operation of the distilling head to take off the heavy phase and reflux the light phase is shown in FIG. 1 wherein the stopcock 44 is open to permit passage of the heavy phase into the seal leg of conduit 58 while the stopcocks 48 and 80 are closed to respectively prevent reflux of heavy phase and the drawing off of the light phase. The heavy phase on rising to the level B in the conduit 58 passes into the take-off conduit 62 and prevents the interface 98 from rising in the decanting column above that level. The light phase 94 on reaching the level A flows through the conduit 70 into reflux conduit 52.

The distilling head will continuously reflux the light phase while drawing off the heavy phase regardless of the relative amounts of each of the two distillate phases introduced into the decanting column. For example, should the flow of the light phase be interrupted, the heavy phase will continue to be drawn off as before while the light phase level and interface level remain constant. Similarly, should the flow of heavy phase be discontinued, the interface level again remains constant and the light phase flow passes into the reflux conduit 70, the heavy phase remaining static in the decanting column and seal leg.

It is apparent from the above that the level of the interface, once established by the introduction of sufficient amounts of both light and heavy phase distillate, does not vary with the amount of flow of either phase but is dependent solely upon the relative densities of the light and heavy phases, a greater disparity between the densities of the phases resulting in a higher interface level. It is of course possible that with phases of closely related densities, if an insufficient amount of heavy phase is initially present, the interface level may move downwardly toward the lower end of the decanting column and possibly even pass into the conduit 58 upon an accumulation of light phase distillate. For this reason, it is generally desirable especially if a small flow of heavy phase is anticipated, to prime the device initially through the chimney 92 with a sufficient quantity of the heavy phase to provide an ample seal leg. It is then immaterial what position the interface level takes along the decanting column and the operation of the device is wholly automatic and requires neither attention nor observation during its operation.

Figure 2:
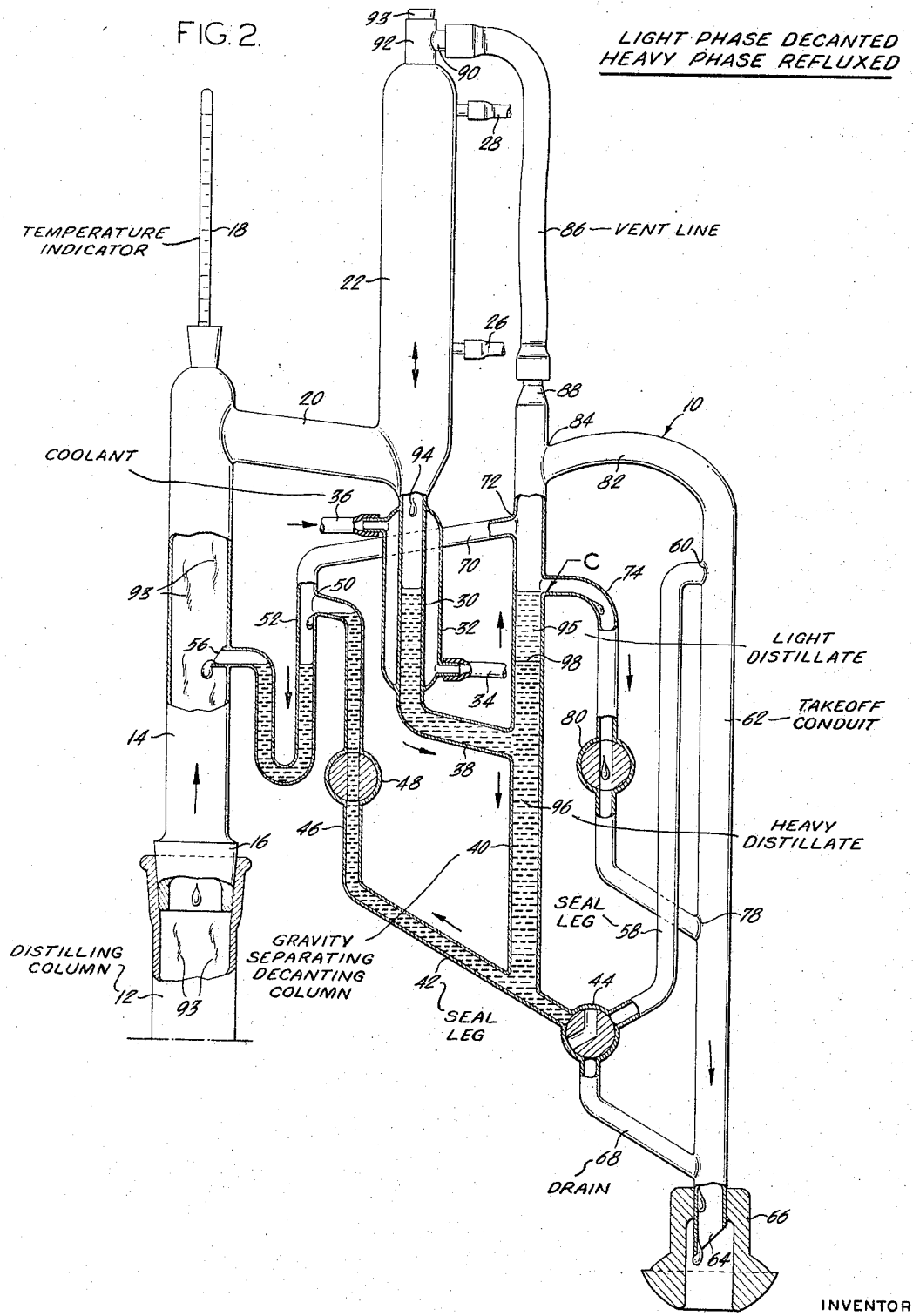
FIG. 2 is a view of the apparatus shown in FIG. 1 showing the reverse flow of the separated distillates wherein the lighter phase is drawn off while the heavier phase is refluxed.

FIG. 2 shows the same embodiment but with the stopcocks being set to permit a reflux of the heavy phase and a removal of the light phase. For this purpose the stopcock 44 is closed and the stopcocks 48 and 80 are opened. The heavy layer forms a seal leg in the conduit 42 and the light phase is restricted to the decanting column 40 from which it passes upon reaching level C into the take-off conduit 74. The heavy layer flows into the reflux conduit 52 from the conduit 46 and is passed back into the distilling column. As in the previously described operation, the position of the interface in the decanting column is of no importance, and the operation is effected continuously and automatically.

It should be noted that by adjustment of the appropriate stopcocks, the apparatus can provide a partial reflux of either the light or heavy phase while refluxing, drawing off or partly refluxing the other phase. For example, by partially closing the stopcock 80 in the operation shown in FIG. 2, the light phase may be partly refluxed and partly drawn off while the heavy phase is refluxed. This is most readily accomplished if the level C is nearly the same height as the level A.

Similarly, for partial reflux of the heavy phase, the stopcock 44 is opened partially to permit a controlled heavy phase flow into conduit 58 while partial reflux continues through conduit 46. The partial reflux operations are not automatic and must be manually controlled due to the flow rate variations of the distillate phases.

The distilling head may be set for total reflux by closing the stopcocks 44 and 80 with stopcock 48 being open or closed. The accidental closing of all of the stopcocks thus results only in a total distillate reflux. The continuously open conduit 70 prevents flooding of the vent lines which might otherwise occur under such circumstances.

Upon completion of the distilling operations, the apparatus may be drained by opening the stopcocks 48 and 80 and successively setting the stopcock 44 to drain the conduits 54 and 42 through the drain line 68.

The height differences between levels A and B, and likewise C and D, determine the minimum difference in specific gravities of the distillate phases which the device will accommodate and must thus be selected accordingly. An additional factor to be considered in this respect is the possibility of pressure surges in the system which would momentarily lift the interface level above the level B or D. A greater level differential between A and B, and C and D would reduce the likelihood of heavy phase distillate passing into either of the light phase conduits.

The relative dimensions of the distilling head including the cross sectional areas of the various conduits and columns must thus be chosen taking into consideration the relative specific gravities of the two phases, the settling characteristics of the phases, the flow rates expected and the possible pressure surges in the system. The distilling head may be built in a general purpose form or constructed in highly specialized versions for difficult separation operations by varying the relative dimensions of the elements, the operational concepts being effectively the same in all instances.

Although the internal dimensions of the conduits are not critical, the decanting column must be of sufficient diameter to prevent entrapment of one distillate phase by the other. The conduit 70 and the take-off conduit 62 must be of sufficient size to carry both liquid and vapor, while the other conduits are preferably as small as practicable to minimize holdup.

Figure 3:
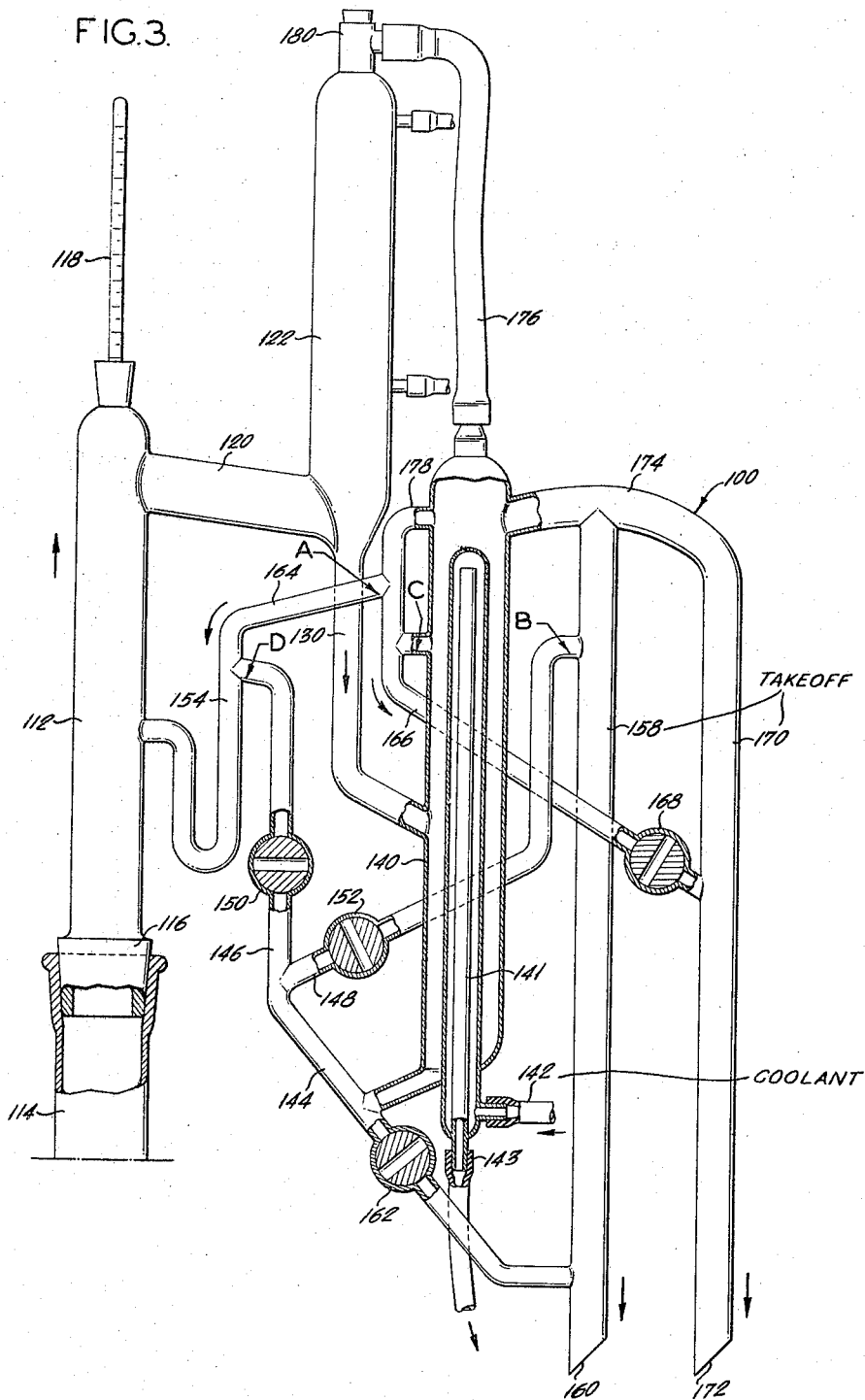
FIG. 3 is a front elevational view of a distilling head illustrating a modified embodiment of the invention.

The embodiment shown in FIG. 3 is in most respects similar or identical with the above described embodiment and the differences reside essentially in the use of an internally cooled decanting column, separate take-off conduits for the light and heavy phase take-off lines, and a modified seal leg arrangement whereby the three-way stopcock is replaced by two stopcocks.

Referring to FIG. 3, the modified distilling head 100 includes vapor riser 112 mounted on the distilling column 114 by means of the connector 116. The upper end of the vapor riser, which is adapted to receive the thermometer 118, opens into lateral duct 120 which extends into the lower end of the condenser 122. The condenser drains downwardly into the distillate conduit 130 which leads into the decanting column 140.

The decanting column is provided with an internal cooling column 141 having cooling fluid inlet and outlet connections 142 and 143. Sloping conduit 144 connects with the lower end of the decanting column and branches upwardly into conduits 146 and 148 which are respectively provided with stopcocks 150 and 152. The conduit 146 extends upwardly to a juncture with the reflux conduit 154 and the conduit 148 extends upwardly to a connection with the vertical take-off conduit 158, the lower end of which terminates in drip tip 160. The lower end of the conduit 144 opens into the take-off conduit 158 and is provided with a stopcock 162.

Conduit 164 connects the upper region of the decanting column with the reflux conduit 154. At a somewhat lower level, conduit 166 provided with stopcock 168 extends downwardly from the decanting column into a second take-off conduit 170 which is also provided with a drip tip 172.

The system is vented in a manner similar to that of the preferred embodiment by the vent line 174 connecting the take-off lines 158 and 170 with the decanting column, vent line 176 connecting the decanting column with the condenser, vent line 178 connecting the decanting column with the conduit 164, and the chimney 180 of the condenser.

The operation of the modified embodiment is the same as that of the preferred embodiment described above, the conduits 146 and 148 in conjunction with conduit 144 being respectively equivalent to conduits 46 and 58. The conduits 164 and 166 similarly are equivalent to the conduits 70 and 74. The levels A, B, C and D indicated on FIG. 3 are in the same relationship as described above with respect to the preferred embodiment, and the remarks directed to the features of construction and manner of operation of the preferred embodiment are equally pertinent to the modified embodiment.

The stopcock 162 is employed solely for draining the system and along with the stopcock 152 serves the function supplied in the preferred embodiment by the three-way stopcock 44. The use of the separate take-off conduits 158 and 170 obviates the need for draining a receiver when the head is changed from light phase to heavy phase removal or vice versa, and is also advantageous during a continuous bleed-off of the refluxed phase to prevent impurity buildup.

The condenser in either embodiment may be made separable from the rest of the device for simplicity of construction and to permit replacement in the event of breakage.

Manifestly, changes in details of construction can be effected by those skilled in the art without departing from the spirit and the scope of the invention as defined in and limited solely by the appended claims.

I claim:

1. In distilling apparatus, means for the separation of two immiscible liquid phases and the selective delivery of the separated phases to either of two points, said means comprising a decanting column, means for introducing a heterogeneous distillate fluid mixture into said decanting column for the gravity separation thereof into heavy and light phases, first and second seal legs in fluid communication with the lower end of said decanting column, means connecting the outlet of said first seal leg with a first point, means connecting the outlet of said second seal leg with a second point, means for selectively controlling the flow through each of said seal legs, first and second fluid conduits connected with fluid openings in the upper region of said decanting column, said first fluid conduit leading to said first point, said second fluid conduit leading to said second point, the fluid opening level in said decanting column of said first conduit being above the outlet level of said second seal leg, the fluid opening level in said decanting column of said second conduit being above the outlet level of said first seal leg, and means for controlling the flow of fluid through said first and second fluid conduits, said seal legs being adapted for the selective delivery of the heavy phase to either said first or second point and said first and second conduits being adapted for the selective delivery of the light phase to either said first or second point.

2. Apparatus as claimed in claim 1 including vent means for providing a common pressure in said decanting column and said seal legs.

3. Apparatus as claimed in claim 1 wherein said means for introducing a heterogeneous fluid mixture comprises a conduit opening into said decanting column below said fluid conduit openings.

4. Apparatus as claimed in claim 1 wherein said means for selectively controlling the flow to each of said seal legs comprises valve means in each said seal leg.

5. In a distilling head comprising a condenser, means for conducting vapors from a vapor source into said condenser, a decanting column, means for conducting distillate from said condenser into said decanting column, said decanting column being adapted to permit the gravity separation into light and heavy phases of a two-phase distillate collected therein, a taffe-off conduit for removing distillate from the system, and a reflux conduit leading back to said vapor source, the improvement comprising means permitting the selective disposition of the separated phases of a two-phase distillate comprising first and second seal legs in fluid communication with the lower end of said decanting column, means connecting the outlet of said first seal leg with said reflux conduit, means connecting the outlet of said second seal leg with said take-off conduit, means for selectively controlling the flow through each of said seal legs, first and second fluid conduits connected with fluid openings in the upper region of said decanting column, said first fluid conduit leading into said reflux conduit, said second fluid conduit leading into said take-off conduit, the fluid opening level in said decanting column of said first conduit being above the outlet level of said second seal leg, the fluid opening level in said decanting column of said second conduit being above the outlet level of said first seal leg, and means for controlling the flow of fluid through said first and second conduits, said seal legs being adapted for the selective delivery of the heavy phase to either said reflux conduit or said take-off conduit and said first and second conduits being adapted for the selective delivery of the light phase to either said reflux conduit or said take-off conduit.

6. Apparatus as claimed in claim 5 including vent means for providing a common pressure in said decanting column and said seal legs.

7. Apparatus as claimed in claim 5 wherein said means for selectively controlling the flow through each of said seal legs comprises valve means in each of said seal leg.

8. Apparatus as claimed in claim 5 wherein said means for controlling the flow of fluid through said first and second fluid conduits comprises valve means in at least one of said fluid conduits.

9. Apparatus as claimed in claim 5 wherein the fluid opening level in said decanting column of one of said fluid conduits is higher than the fluid opening level of the other of said fluid conduits and wherein said means for controlling the flow of fluid through said fluid conduits comprises valve means in the fluid conduit connecting with the lower fluid opening in said decanting column.

10. A laboratory distilling head for use in conjunction with a vapor source for the separation and selective disposition of the phases of a two-phase distillate comprising a condenser, means for conducting vapors from the vapor source into said condenser, a decanting column, means for conducting distillate from said condenser into said decanting column, first and second seal legs in fluid connection with the lower end of said decanting column, a reflux conduit leading back into the vapor source, means connecting the outlet of said first seal leg with said reflux conduit, a take-off conduit means connecting the outlet of said second seal leg with said take-off conduit, means for selectively controlling the flow through each of said seal legs, first and second fluid conduits connected with fluid openings in the upper region of said decanting column, said first fluid conduit leading into said reflux conduit, said second fluid conduit leading into said take-off conduit, the fluid opening level in said decanting column of said first conduit being above the outlet level of said second seal leg, the fluid opening level in said decanting column of said second conduit being above the outlet level of said first seal leg, and means for controlling the flow of fluid through said first and second fluid conduits, whereby said seal legs are adapted for selective delivery of the heavy phase to either said reflux conduit or said take-off conduit and said first and second fluid conduits are adapted for the selective delivery of the light phase to either of said reflux conduit or said take-off conduit.

11. Apparatus as claimed in claim 10 including vent means for providing a common pressure in said decanting column and said seal legs.

12. Apparatus as claimed in claim 10 wherein said second seal leg and said second fluid conduit lead into separate take-off conduits.

13. Apparatus as claimed in claim 10 wherein said means for selectively controlling the flow through each of said seal legs comprises valve means in each said seal leg.

14. Apparatus as claimed in claim 10 wherein said means for conducting distillate from said condenser into said decanting column comprises a conduit leading from said condenser and opening into said decanting column below said fluid conduit openings.

15. Apparatus as claimed in claim 10 wherein the fluid opening level in said decanting column of one of said fluid conduits is higher than the fluid opening level of the other of said fluid conduits and wherein said means for controlling the flow of fluid through said fluid conduits comprises valve means in the fluid conduit connecting with the lower fluid opening in said decanting column.

No references cited.

NORMAN YUDKOFF, *Primary Examiner.*

J. SOFER, *Assistant Examiner.*